United States Patent [19]

Holden et al.

[11] 3,847,651
[45] Nov. 12, 1974

[54] PROCESS FOR PROVIDING AN OPAQUE WATERPROOF PROTECTIVE COATING FILM ON A SUBSTRATE

[75] Inventors: Harold William Holden; Henry Peter Schreiber, both of, Mont-Saint-Hilaire, Quebec, Canada

[73] Assignee: Canadian Industries Limited, Montreal, Province of Quebec, Canada

[22] Filed: Mar. 26, 1973

[21] Appl. No.: 344,613

[30] Foreign Application Priority Data
Apr. 14, 1972 Canada .............................. 140449

[52] U.S. Cl. .................... 117/72, 117/75, 117/76 F, 117/76 P
[51] Int. Cl. ............................................. B44d 1/14
[58] Field of Search ........... 117/63, 135.5, 72, 76 T, 117/75, 161 UB

[56] References Cited
UNITED STATES PATENTS

| | | | |
|---|---|---|---|
| 3,501,326 | 3/1970 | Hochberg et al. | 117/76 T |
| 3,551,830 | 12/1970 | Hodge et al. | 117/76 T |
| 3,100,721 | 8/1963 | Holden | 117/135.5 |
| 3,505,096 | 4/1970 | Egitto et al. | 117/142 X |
| 3,540,916 | 11/1970 | Fukada et al. | 117/63 |
| 3,669,728 | 6/1972 | Seiner | 117/161 UB X |

*Primary Examiner*—Ralph Husack
*Attorney, Agent, or Firm*—Alexander O. McIntosh

[57] ABSTRACT

The permeability to water of pigment-free opaque coatings formed by precipitation of a film-forming polymer from a mixed solvent containing a component that is a nonsolvent for the polymer is prevented by applying to the coating a solution of a non-polar polymer dissolved in a non-aqueous solvent. The composite coatings are pigment-free, opaque and impervious to water.

4 Claims, No Drawings

PROCESS FOR PROVIDING AN OPAQUE WATERPROOF PROTECTIVE COATING FILM ON A SUBSTRATE

This invention relates to opaque pigment-free surface coatings and to a process for preparing the same.

Opacity is a well known defect in clear surface coatings caused by an unsuitable balance between diluent and active solvent in the coating composition. If the solvent is of higher volatility than the diluent a portion of the coating resins precipitates during solvent evaporation causing opacity. The defect is known as "blushing." In the application of this effect pigment-free coatings that are opaque have been prepared by precipitation from a mixed solvent system containing a non-solvent of low volatility and a solvent of high volatility. (Hiding Without Pigments, Harry Burrell, Journal of Paint Technology, Vol. 43, No. 559, August 1971, page 48). The preparation of such coatings is disclosed in Canadian Patent No. 856,310 to Jerome Allan Seiner issued on Nov. 17, 1970.

It is disclosed in Canadian Pat. No. 856,310 that, depending upon the balance of the non-solvent of low volatility and the solvent of high volatility, the films produced may be continuous and transparent, or opaque with communicating open cells, or opaque with closed cells. The cells of open-celled films formed from certain coating resins absorb water resulting in a loss of opacity of the film.

It has now been found that the permeability to water of such open-celled opaque coatings can be prevented by treating the opaque coatings with a dilute solution of non-polar material such as ethylene-propylene diene monomer terpolymer rubber, styrene butadiene rubber, perfluorinated organic compounds and siloxane-oxyalkylene silicone copolymers. The non-polar material causes the coating to become waterproof while remaining opaque.

It is thus the main object of this invention to provide microporous opaque pigmentless coatings that are waterproof. Additional objects will appear hearinafter.

The opaque waterproof films of this invention are prepared by a process comprising the steps of a. applying to a substrate a composition containing a gellable, film-forming polymer and a mixed solvent for said polymer comprising at least two miscible liquids, one of the liquids being a non-solvent for said polymer and having a volatility substantially less than the other liquid or liquids of the solvent, the proportion of non-solvent in the solvent mixture being such that during evaporation of the solvent the polymer is precipitated forming an open-celled porous coating on the substrate, b. eliminating the solvent from the composition, thus forming on the substrate a porous opaque open-celled coating that absorbs water, c. applying to the coating on the substrate a solution of a non-polar polymer containing from 0.05 to 6.0 percent by weight of the non-polar polymer dissolved in a non-aqueous solvent that is not a solvent of the film-forming polymer, and d. eliminating the solvent from the non-polar polymer.

Suitable gellable film-forming polymers are cellulose acetate butyrate, polyethylene, polypropylene, polyhexamethylene adipamide (nylon 66), polyhexamethylene sebacamide (nylon 610) and polycaprolactam (nylon 6) and blends and copolymers of these nylons; and poly(vinylidene chloride).

Suitable solvents for the gellable film-forming polymer depend upon the particular polymer employed. Classes of solvents that may be employed are ketones, esters, alcohols, aliphatic hydrocarbons, aromatic hydrocarbons, and chlorinated hydrocarbons.

The solvent system employed in the invention comprises at least two miscible liquids, one of which is a non-solvent for the polymer ingredient. The non-solvent must have a volatility that is substantially less than the volatility of the other liquid or liquids of the solvent system. The quantity of the non-solvent in the mixture must be such that as the solvent system evaporates the polymer precipitates to form an opaque coating. The proportion of the solvent system thus will depend upon the film-forming polymer and the particular liquids employed in the solvent system.

It is believed that the mechanism by which the opaque film forms is as follows. After the composition dissolved in the solvent system is spread on the substrate, the most volatile liquid of the solvent system evaporates more rapidly than the non-solvent. After a portion of the solvents has evaporated, the film-forming polymer gels. The non-solvent then separates as droplets within the polymer. Finally the non-solvent evaporates leaving voids in the polymer. The voids causes dispersion of light resulting in opacity of the resulting film.

Suitable non-polar materials for rendering the opaque film impervious to water include the terpolymer rubbers which are copolymers of ethylene, propylene and a diene such as dicyclopentadiene, 1,4-hexadiene, methyl norbornene and ethylidene norbornene, containing from 1 to 10 percent by weight of the diene; styrene butadiene rubbers, perfluorinated organic compounds and siloxane-oxyalkylene silicone copolymers. By perfluorinated organic compounds are meant compounds such as polyacrylic acid 1,1-dihydroperfluoralkyl ester. These materials are known by the registered trademark "Scotchgard" and are described in Ullmanns Encyklopadie der Technischen Chemie, Erganzungsband, page 168, 170. Siloxane-oxyalkylene silicone copolymers are disclosed in Belgian Pat. Nos. 582,362 and 584,089. The nonpolar material is dissolved in a solvent that is not a solvent for the substrate underlying the opaque film. The non-polar materials are used as dilute solutions (0.05 to 6.0 percent by weight, preferably 0.5 to 2.0 percent by weight). They are applied to the opaque open-celled porous film and penetrate into the pore structure. The solvent then is allowed to evaporate. The non-polar material is believed to form a coating on the inside of the pores of the opaque film.

The substrate upon which the coating is placed commonly is metal such as steel (protected by a primer coat) but may also be glass or a polymeric material such as polyethylene film or a paper web.

The coatings of this invention are pigment-free but opaque and impervious to water. Since the polymer used to waterproof the coating is not exposed to soiling, many inexpensive polymers may be used as treating agents. The polymer used as treating agent may be chosen so as to confer additional properties to the coating such as resistance to crushing and marring.

The invention is additionally illustrated by the following examples.

EXAMPLES 1 to 9

Nine 4 inch square panels of mild steel having surfaces treated by "Bonderizing" (Registered Trademark) were coated with a 19 percent solution in methanol/water 69/31 by weight of a copolymer of caprolactam, hexamethylene adipamide and hexamethylene sebacamide. The compositions at 55°C. to 65°C. were spread on the panels with a doctor blade and the coatings allowed to dry. The coatings were opaque and open-celled, capable of imbibing water.

Each panel was then treated in corner areas with four concentrations of a solution of a non-polar polymer. The effects of the treatments on the coating opacity, mar-resistance and water hold-out were each rated by visual inspection and intercomparison. An opacity rating of ten was given to a coating in which the treated area was indistinguishable from the untreated area. For the mar-resistance test a sapphire stylus of 0.008 inch radius was drawn slowly over the coating, with a 60 or 110 gram normal load applied. Untreated coatings lost opacity at both loadings. The resistance of treated coatings was shown in several ways, temporary indentation, indentation without loss of opacity, loss but recovery of opacity, reduced but more or less permanent loss of opacity. The rating for mar-resistance is a composite for both loadings.

Water hold-out of untreated coatings was less than 2 seconds, while the best treated coatings showed no penetration after about 10 minutes. Ratings were scored "poor" to "excellent" accordingly.

The results were as follows.

Example 1

Treating solution: Butyl rubber in xylene

| Concentration | Opacity Rating | Mar-Resistance | Water Hold-out |
|---|---|---|---|
| 5% | 10 | very good | excellent |
| 2% | 10 | very good | excellent |
| 1% | 10 | good | very good |
| 0.2% | 10 | fair | poor |

Example 2

Treating solution: Styrene-butadiene rubber in xylene

| Concentration | Opacity Rating | Mar-Resistance | Water Hold-out |
|---|---|---|---|
| 5% | 10 | very good | excellent |
| 2% | 10 | very good | very good |
| 1% | 10 | fair | very good |
| 0.2% | 10 | poor | fair |

Example 3

Treating solution: Ethylene propylene diene monomer rubber in xylene

| Concentration | Opacity Rating | Mar-Resistance | Water Hold-out |
|---|---|---|---|
| 5% | 9½ | excellent | excellent |
| 2% | 10 | excellent | excellent |
| 1% | 10 | good | fair |
| 0.2% | 10 | fair | very good |

Example 4

Treating solution: Ethylene/28% vinyl acetate copolymer in xylene

| Concentration | Opacity Rating | Mar-Resistance | Water Hold-out |
|---|---|---|---|
| 2% | 10 | very good | excellent |
| 1% | 10 | very good | excellent |
| 0.5% | 10 | good | fair |
| 0.2% | 10 | fair | very good |

The treated coatings of the first four examples were dried at room temperature but finished with 7 minutes heating at 121°C. to speed up the experiment and render the conditions more uniform.

Example 5

Treating solution: Unpigmented acrylic enamel formulation in xylene

| Concentration (solids basis) | Opacity Before Baking | Opacity After Baking | Mar-Resistance Before Baking | Mar-Resistance After Baking | Water Hold-out After Baking |
|---|---|---|---|---|---|
| 20% | | 6 | | fair | excellent |
| 10% | 7 | 8 | poor | poor, irregular, tearing | excellent |
| 5% | 10 | 10 | good | poor, irregular, tearing | excellent |
| 2.5% | 10 | 10 | very good | poor, irregular, tearing | excellent |

After air dry the treated coating was baked at 121°C. for 60 minutes.

Example 6

Treating solution: Unpigmented acrylic lacquer (substantially polymethylmethacrylate) in 70/30 toluene/acetone. After air dry the treated coating was baked at 121°C. for 60 minutes.

| Concentration (solids basis) | Opacity Before Baking | Opacity After Baking | Mar-Resistance Before Baking | Mar-Resistance After Baking | Water Hold-out After Baking |
|---|---|---|---|---|---|
| 23.3% | | 3 | | very good | excellent |
| 11.6% | | 7 | | poor, coating tends to tear | excellent |
| 5.8% | 7½ | 8 | fair | poor, coating tends to tear | excellent |
| 2.9% | 8½ | 9 | poor | poor, coating tends to tear | excellent |

Example 7

Treating solution: Polystyrene in xylene (treated coating baked 30 minutes at 121°C.)

| Concentration | Opacity Rating | Mar-Resistance Before Baking | Mar-Resistance After Baking | Water Hold-out After Baking |
|---|---|---|---|---|
| 6% | 9 | fair | fair | excellent |
| 1.25% | 10 | fair | fair | excellent |
| 0.25% | 10 | fair | fair | good |
| 0.05% | 10 | fair | fair | fair |

Example 8

Treating solution: Ethylene/18 percent vinyl acetate copolymer in xylene (treated coating baked 7 minutes at 121°C.)

| Concentration (solids basis) | Opacity Before Baking | Opacity After Baking | Mar-Resistance Before Baking | Mar-Resistance After Baking | Water Hold-out After Baking |
|---|---|---|---|---|---|
| 6% | 9½ | 9 | fair | very good | excellent |
| 1.25% | 10 | 9½ | fair | very good | excellent |
| 0.25% | 10 | 10 | poor | good | excellent |
| 0.05% | 10 | 10 | poor | good | fair |

Example 9

Treating solution: Emulsion of vinylidene chloride/acrylonitrile copolymer diluted with water. The treated coating was baked for 15 minutes at 121°C.

| Concentration (solids basis) | Opacity Rating | Mar-Resistance | Water Hold-out |
|---|---|---|---|
| 5% | 7 | very good | fair |
| 2% | 8 | good | poor |
| 1% | 9 | poor | poor |
| 0.5% | 9 | poor | poor |

The results suggest that the latex did not penetrate the pore structure of the coating in a uniform manner.

What we claim is:

1. A process for preparing an opaque waterproof protective coating film which comprises the steps of
   a. applying to the surface of a substrate a composition consisting essentially of a gellable film-forming polymer and a mixed solvent for said polymer comprising at least two miscible liquids, one of the liquids being a non-solvent for said polymer and having a volatility substantially less than that of the other liquid or liquids of the solvent, the proportion of non-solvent in the solvent mixture being such that during evaporation of the solvent the polymer is precipitated forming an open-celled porous continuous coating on the substrate,
   b. eliminating the solvent from the composition, thus forming on the substrate a microporous opaque open-celled coating that absorbs water,
   c. applying to the coating on the substrate a solution of a non-polar polymer selected from the group consisting of ethylene-propylene diene terpolymer rubbers, styrene-butadiene rubbers, butyl rubber, ethylene-vinyl acetate copolymers, polystyrene, and vinylidene chloride-acrylonitrile copolymers containing from 0.05 to 6.0 percent by weight of the non-polar polymer dissolved in a non-aqueous solvent that is not a solvent for the film-forming polymer, and
   d. eliminating the solvent from the non-polar polymer to form a waterproof coating on the surface of the substrate.

2. A process as claimed in claim 1 wherein the solution of non-polar polymer contains from 0.5 to 2.0 percent by weight of the non-polar polymer.

3. A process as claimed in claim 1 wherein the film-forming polymer is selected from the group consisting of polyhexamethylene adipamide, polyhexamethylene sebacamide, polycaprolactam and blends and copolymers thereof.

4. A substrate having on its surface a protective coating film formed by the process of claim 1.

* * * * *